(12) United States Patent
Cook et al.

(10) Patent No.: US 11,479,881 B2
(45) Date of Patent: Oct. 25, 2022

(54) MANUFACTURE OF INTERMEDIATE MODULUS CARBON FIBER

(71) Applicant: Cytec Industries Inc., Woodland Park, NJ (US)

(72) Inventors: John Desmond Cook, Piedmont, SC (US); Thomas Taylor, Greenville, SC (US); Girish Vishnukant Deshpande, Simpsonville, SC (US); Longgui Tang, Greenville, SC (US); Barry DeWayne Meece, Piedmont, SC (US); Suzanne Crawford, Anderson, SC (US); Shao C. Chiu, Alpharetta, GA (US); Billy D. Harmon, Simpsonville, SC (US); Alan Thomas, Mauldin, SC (US)

(73) Assignee: Cytec Industries Inc., Princeton, NJ (US)

( * ) Notice: Subject to any disclaimer, the term of this patent is extended or adjusted under 35 U.S.C. 154(b) by 201 days.

(21) Appl. No.: 15/315,220

(22) PCT Filed: Feb. 15, 2016

(86) PCT No.: PCT/US2016/017940
§ 371 (c)(1),
(2) Date: Nov. 30, 2016

(87) PCT Pub. No.: WO2016/144488
PCT Pub. Date: Sep. 15, 2016

(65) Prior Publication Data
US 2017/0362742 A1 Dec. 21, 2017

Related U.S. Application Data

(60) Provisional application No. 62/132,137, filed on Mar. 12, 2015.

(51) Int. Cl.
| | | |
|---|---|---|
| B29C 48/05 | (2019.01) |
| D01D 5/06 | (2006.01) |
| B29C 48/00 | (2019.01) |
| D01F 6/18 | (2006.01) |
| D01F 9/22 | (2006.01) |
| D01F 9/12 | (2006.01) |
| D01F 6/38 | (2006.01) |
| B29K 33/20 | (2006.01) |
| B29L 31/00 | (2006.01) |

(52) U.S. Cl.
CPC ............ D01D 5/06 (2013.01); B29C 48/022 (2019.02); B29C 48/05 (2019.02); D01F 6/18 (2013.01); D01F 9/12 (2013.01); D01F 9/22 (2013.01); *B29K 2033/20* (2013.01); *B29L 2031/731* (2013.01); *D01F 6/38* (2013.01); *D01F 9/225* (2013.01)

(58) Field of Classification Search
CPC .... B29C 47/0014; B29C 47/0004; D01D 5/06
See application file for complete search history.

(56) References Cited

U.S. PATENT DOCUMENTS

| | | | | |
|---|---|---|---|---|
| 4,919,860 A * | 4/1990 | Schindler | ........... | B01D 67/0067 210/500.21 |
| 6,228,966 B1 * | 5/2001 | Neuert | ...................... | D01F 6/18 524/222 |
| 6,326,451 B1 * | 12/2001 | Hamada | ................... | D01F 6/38 526/342 |
| 7,749,479 B2 | 7/2010 | Leon y Leon | | |
| 8,236,273 B2 | 8/2012 | Oyama et al. | | |
| 8,372,323 B2 | 2/2013 | Wilkinson | | |
| 8,801,985 B2 | 8/2014 | Ikeda et al. | | |
| 2006/0197244 A1 * | 9/2006 | Simpson | ............. | B29C 47/0014 264/29.7 |
| 2008/0118427 A1 * | 5/2008 | Leon y Leon | .......... | D01F 9/225 423/447.2 |
| 2011/0003239 A1 * | 1/2011 | Kadowaki | ........... | H01M 8/0221 429/514 |
| 2012/0088104 A1 | 4/2012 | Hashimoto et al. | | |
| 2013/0084455 A1 * | 4/2013 | Naskar | ...................... | D01D 5/24 428/367 |
| 2013/0101494 A1 * | 4/2013 | Ural | ...................... | C09D 183/10 423/447.2 |
| 2013/0302714 A1 * | 11/2013 | Sumioka | ................... | D01F 9/22 429/481 |
| 2015/0376064 A1 * | 12/2015 | Chung | .................. | C04B 33/326 501/100 |
| 2016/0326672 A1 * | 11/2016 | Higuchi | ................... | D01F 9/22 |
| 2017/0233897 A1 * | 8/2017 | Nakanishi | ................. | D01F 6/18 428/219 |

FOREIGN PATENT DOCUMENTS

| | | |
|---|---|---|
| CN | 102766989 A | 11/2012 |
| CN | 102766989 B * | 12/2014 |
| JP | H0397918 A | 4/1991 |
| JP | H4257313 A | 9/1992 |
| JP | 201053468 A | 3/2010 |
| WO | 2010/143680 A1 | 12/2010 |

OTHER PUBLICATIONS

International Search Report issued in corresponding PCT Application No. PCT/US2016/071940, dated Jun. 3, 2016, pp. 1.

* cited by examiner

*Primary Examiner* — Cedrick S Williams
(74) *Attorney, Agent, or Firm* — Thi Dang

(57) ABSTRACT

The present disclosure relates generally to carbon fibers having high tensile strength and modulus of elasticity, as well as a process for the manufacture of such carbon fiber. The process comprises spinning a polymer/solvent solution into a solvent/water bath in the range of 78%-85% solvent, thereby producing a dense fiber structure, and subsequently carbonizing the polymer precursor fiber at a lower than typical carbonization temperature to form carbon fibers.

11 Claims, No Drawings

MANUFACTURE OF INTERMEDIATE MODULUS CARBON FIBER

CROSS REFERENCE TO RELATED APPLICATIONS

The present application is a National Stage Application of and claims priority to PCT/US2016/017940, filed on Feb. 15, 2016, which is a PCT application of and claims priority to U.S. Provisional Application No. 62/132,137, filed Mar. 12, 2015, each of which are incorporated herein in their entireties.

BACKGROUND OF THE INVENTION

The present disclosure relates generally to carbon fibers having high tensile strength and modulus of elasticity, as well as a process for the manufacture of such carbon fiber.

Carbon fibers have been used in a wide variety of applications because of their desirable properties, such as high strength and stiffness, high chemical resistance and low thermal expansion. For example, carbon fibers can be formed into a structural part that combines high strength and high stiffness, while having a weight that is significantly lighter than a metal component of equivalent properties. Increasingly, carbon fibers are being used as structural components in composite materials for aerospace and automotive applications, among others. In particular, composite materials have been developed wherein carbon fibers serve as a reinforcing material in a resin or ceramic matrix.

In order to meet the rigorous demands of the various industries, particularly aerospace, it is necessary to continually develop new carbon fibers having both high tensile strength (about 800 ksi or greater) and high modulus of elasticity (about 40 Msi or greater), as well as having no surface flaws or internal defects. Carbon fibers having individually higher tensile strength and modulus can be used in fewer quantities than lower strength carbon fibers and still achieve the same total strength for a given carbon fiber-reinforced composite part. As a result, the composite part containing the carbon fibers weighs less. A decrease in structural weight is important to the aerospace and auto industries because it increases the fuel efficiency and/or the load carrying capacity of the aircraft or auto incorporating such a composite part.

Carbon fiber from acrylonitrile is generally produced by a series of manufacturing steps or stages. Acrylonitrile monomer is first polymerized by mixing it with one or more co-monomers (e.g., itaconic acid, methacrylic acid, methyl acrylate and/or methyl methacrylate) and reacting the mixture with a catalyst in a conventional solution polymerization or suspension process to form polyacrylonitrile (PAN) polymer solution (spin "dope"). PAN is currently the most widely used precursor for carbon fibers.

Once polymerized, the PAN dope is spun into precursor (acrylic) fibers using one of several different methods. In one method (dry spinning), the heated dope is pumped (filtered) through tiny holes of a spinnerette into a tower or chamber of heated inert gas where the solvent evaporates, leaving a solid fiber.

In another method (wet spinning), the heated polymer solution ("spinning dope") is pumped through tiny holes of a spinnerette into a coagulation bath where the spinning dope coagulates and solidifies into fibers. Wet spinning can be further divided into one of the minor processes of (1) wet-jet spinning, wherein the spinnerette is submerged in the coagulation bath; (2) air gap or dry jet spinning, wherein the polymer jets exit the spinnerette and pass through a small air gap (typically 2-10 mm) prior to contacting the coagulation bath; and (3) gel spinning, wherein the dope is thermally induced to phase change from a fluid solution to a gel network. In both dry and wet spinning methods, the fiber is subsequently washed and stretched through a series of one or more baths.

After spinning and stretching the precursor fibers and before they are carbonized, the fibers need to be chemically altered to convert their linear molecular arrangement to a more thermally stable molecular ladder structure. This is accomplished by heating the fibers in air to about 200-300° C. (about 390-590° F.) for about 30-120 minutes. This causes the fibers to pick up oxygen molecules from the air and rearrange their atomic bonding pattern. This oxidation or thermal stabilization step can occur by a variety of processes, such as drawing the fibers through a series of heated chambers or passing the fibers over hot rollers.

After oxidation, the stabilized precursor fibers are heated (carbonized) to a maximum temperature of about 1000-3000° C. (about 1800-5500° F.) for several minutes in one or two furnaces filled with a gas mixture free of oxygen. As the fibers are heated, they begin to lose their non-carbon atoms in the form of various gases such as water vapor, hydrogen cyanide, ammonia, carbon monoxide, carbon dioxide, hydrogen and nitrogen. As the non-carbon atoms are expelled, the remaining carbon atoms form tightly bonded carbon crystals that are aligned parallel to the long axis of the fiber.

The resultant carbon fibers have a surface that does not bond well with epoxies and other materials used in composite materials. To give the fibers better bonding properties, their surface is slightly oxidized. The addition of oxygen atoms to the surface provides better chemical bonding properties and also removes weakly bound crystallites for better mechanical bonding properties.

Once oxidized, the carbon fibers are coated ("sized") to protect them from damage during winding or weaving. Sizing materials that are applied to the fibers are typically chosen to be compatible with the epoxies used to form composite materials. Typical sizing materials include epoxy, polyester, nylon, urethane and others.

High modulus of carbon fibers comes from the high crystallinity and high degree of alignment of crystallites in the fiber direction, while the high strength of carbon fibers is primarily achieved by the elimination of defects and development of crystalline morphologies in fibers. It is believed that increasing heat treatment temperatures to develop a larger and oriented graphitic structure can improve Young's modulus, while removing flaws has the potential to improve fiber strength.

Several methods of increasing tensile strength and modulus have been explored in the prior art. For example, it is generally known that modulus can be increased by increasing carbonization temperatures. However, increases in carbonization temperatures result in a decrease in compressive and shear strengths. As a result, this method has generally not provided an effective means for preparing carbon fibers having both improved modulus of elasticity and compressive and shear strengths.

Other methods have focused on stretching the precursor fibers before or during the process of converting the precursor fiber to a carbon fiber. It has previously been recognized in the prior art that the modulus of carbon fibers can be improved by stretching the fibers in a post-spinning step, oxidizing step, carbonizing step, or combination thereof. However, conventional wisdom believes that the amount of stretching in the oxidizing step is limited by tension levels in the fibers that develop in response to the onset of chemical reactions, such as thermally induced cyclization and/or oxidative crosslinking of the PAN precursor fibers. The accumulation of tension causes the fibers to break at relatively low stretches under standard oxidation conditions (e.g., above 180° C.). As a result, prior attempts to stretch PAN fibers during oxidation have generally been limited to a maximum amount of stretch or to a single continuous stretch. Excessive stretching in the post precursor process results in lower diameter carbon fibers which have lower compressive and shear strengths.

Conventional techniques for improving tensile strength of carbon fiber as a resin impregnated strand have been concerned with decrease of macro-defects, for example, for decreasing impurities existing inside single filaments constituting the carbon fibers, or for inhibiting the production of macro-voids formed inside the single filaments, and for reducing defects generated on the surfaces of the single filaments. Attempts at decreasing inner impurities have included improving the filtration of monomer or polymer dope. Surface defects have been reduced by controlling the shape of fiber guides used in the production process of precursor fibers.

Densification of undrawn fibers by optimizing the conditions of the coagulation bath is also known. This technique obtains carbon fibers having high tensile strength and modulus by dissolving a specific acrylonitrile polymer containing 95 wt % or more acrylonitrile in dimethylformamide as a solvent, wet spinning the resultant dope, drawing and washing the resultant precursor fiber, and oxidizing and carbonizing the washed fibers. However, excessive densification tends to lower oxygen permeability into the fibers when stabilized, resulting in a reduction in tensile strength expressed as a resin impregnated strand of carbon fibers obtained by this process.

Thus, there exists a need for carbon fibers having both high compressive strength and high modulus of elasticity, as well as a process for preparing such carbon fibers. Further, there is a need for carbon fibers having both high tensile strength and high modulus of elasticity when resin impregnated.

SUMMARY OF THE INVENTION

The present invention provides carbon fibers having improved strength and modulus and a process that can be used to prepare the carbon fibers. Carbon fiber precursor fibers according to the present invention have been produced from a polymer having a weight average molecular weight $M_w$ of about 100,000 to about 300,000 and a degree of polydispersity $M_w/M_n$ of 2.0 to 3.0, wherein $M_n$ is the number average molecular weight of the polymer. Preferably, the degree of polydispersity $M_w/M_n$ of the polymer used to produce carbon fiber precursor fibers is from 2.1 to 2.6. Coagulated carbon fiber precursor fibers according to the present invention can have a porosity range of about 30 to about 70%.

The present invention further provides a process for producing carbon fibers. According to the present invention, a polymer solution having a concentration of about 19% to about 24% polymer is spun in a coagulation bath at a coagulation bath concentration of about 70% to about 85% solvent and about 15% to about 30% water, thereby forming carbon fiber precursor fibers. The coagulation bath can have a bath temperature of from about 0° C. to about 10° C. In one embodiment, the coagulation bath solvent is dimethyl sulfoxide ('DMSO').

In one embodiment, the polymer is a polyacrylonitrile based polymer. In one embodiment, the polyacrylonitrile based polymer is a copolymer formed from the polymerization of acrylonitrile with comonomers chosen from itaconic acid, methacrylic acid, methacrylate and combinations thereof. In one embodiment, the polymer has a copolymer content of up to about 4% monomeric constituents and an acrylonitrile content of about 96% or greater. The polymer can have a weight averaged molecular weight ($M_w$) of about 100,000 to about 300,000; more preferably, about 120,000 to about 180,000.

In one embodiment, the polymer solution is spun by air-gap spinning. The air-gap spacing from the face of the spinneret to the surface of the coagulation bath can be about 2 mm to about 10 mm.

Carbon fiber precursor fibers from the coagulation bath have an average pore diameter of about 0.01 µm to about 0.03 µm with a porosity of about 30% to about 70%. Carbon fiber precursor fibers from the coagulation bath can also have a degree of swelling of from about 80% to about 120%.

Spun fibers are then drawn through one or more draw and wash baths in order to stretch and remove solvent from the fibers. The bath temperatures of the one or more draw baths are from about 40° C. to about 100° C. In one embodiment, the carbon fiber precursor fibers are spun and drawn at a speed of about 100 to about 400 meters/minute. The carbon fiber precursor fibers are substantially free of solvent after drawing the fibers through the baths. By "substantially free of solvent", the carbon fiber precursor fibers have about 500 ppm or less residual solvent.

The carbon fiber precursor fibers are then stabilized and carbonized at a maximum temperature of from about 1100° C. to about 1500° C. Preferably, the carbon fiber precursor fiber filaments are stabilized in air at an oxidation temperature of about 200° C. to about 300° C. at a stretch ratio of about 0.80 to about 1.35.

DETAILED DESCRIPTION OF THE INVENTION

The present invention will now be described more fully hereinafter. These inventions may be embodied in many different forms and should not be construed as limited to the embodiments set forth herein; rather, these embodiments are provided so that this disclosure will satisfy applicable legal requirements. Like numbers refer to like elements throughout.

In one aspect, the present invention is directed towards carbon fibers having improved tensile strength and modulus of elasticity. In another aspect, the invention is directed towards a process of making those carbon fibers. Carbon fibers prepared in accordance with the process described herein can have a tensile strength approaching and exceeding 800 ksi and a modulus of elasticity approaching and exceeding 40 Msi.

The process developed for the production of intermediate modulus (IM) fiber is the basis for the invention. The inventive process produces carbon fiber with tensile properties of about 830 to about 870 ksi tensile strength and about 43 to about 44 Msi tensile modulus.

As discussed in greater detail below, carbon fibers in accordance with the invention can be prepared by coagulating polymer dope at a high coagulation concentration (about 70 wt % or greater solvent and up to about 30 wt % water)

to develop a dense precursor fiber structure. This dense structure enables high stretch through oxidation and pre-carbonization, allowing intermediate modulus tensile properties to be developed at a carbonization temperature of less than about 1400° C. rather than typical carbonization temperatures of about 1450° C. or greater. Because the dense precursor fiber structure allows carbonization to be conducted at a lower temperature, improved surface functionality of the fiber can be provided as the surface is less graphitic than a carbon fiber surface produced at the higher temperature of 1450° C. or greater. In the context of the invention the term "fiber" includes a single filament or a plurality of filaments that are bundled together, also referred to as a "tow". A tow or bundle may include from about 1,000 to 50,000 individual filaments.

In the context of the invention, the term "precursor fiber" refers to a fiber comprising a polymeric material that can, upon the application of sufficient heat, be converted into a carbon fiber having a carbon content that is about 90% or greater, and in particular about 95% or greater, by weight. The precursor fiber can comprise both homopolymers and copolymers of acrylonitrile (AN), and may include copolymers such as methyl acrylate (MA), methacrylic acid (MAA), sodium methallylsulfonate (SMAS), itaconic acid (ITA), vinyl bromide (VB), isobutyl methacrylate (IBMA), and combinations thereof.

Polymerization

PAN polymers can be made by solution polymerization or suspension polymerization. In solution polymerization, the acrylonitrile (AN) monomer is mixed with a solvent, and one or more co-monomers to form a solution. Suitable solvents for solution polymerization include dimethyl sulfoxide (DMSO), dimethyl formamide (DMF) and dimethyl acetamide (DMAc), among others. Examples of comonomers suitable for synthesis of PAN polymers include one or more vinyl-based acids such as methacrylic acid (MAA), acrylic acid (AA), and itaconic acid (ITA); vinyl-based esters such as methacrylate (MA), ethyl acrylate (EA), butyl acrylate (BA), methyl methacrylate (MMA), ethyl methacrylate (EMA), propyl methacrylate, butyl methacrylate, β-hydroxyethyl methacrylate, dimethylaminoethyl methacrylate, 2-ethylhexylacrylate, isopropyl acetate, vinyl acetate (VA), and vinyl propionate; other vinyl derivatives (e.g., vinyl amides such as vinyl imidazole (VIM), acrylamide (AAm), and diacetone acrylamide (DAAm); and vinyl halides such as allyl chloride, vinyl bromide, vinyl chloride and vinylidene chloride); ammonium salts of vinyl compounds and sodium salts of sulfonic acids (e.g., sodium vinyl sulfonate, sodium p-styrene sulfonate (SSS), sodium methallyl sulfonate (SMS), and sodium-2-acrylamido-2-methyl propane sulfonate (SAMPS)), and others. Preferably, the comonomer is itaconic acid and/or methacrylic acid. The solution is then heated to a temperature above room temperature (i.e., greater than 25° C.), for example, to a temperature of about 40° C. to about 85° C.

After heating, an initiator is added to the solution to initiate the polymerization reaction. PAN polymerization can be initiated by an initiator (or catalyst) of azo-based compound (e.g., azo-bisisobutyronitrile (AIBN), azobiscyanovaleric acid (ACVA), and 2,2'-azobis-(2,4-dimethyl) valeronitrile (ABVN), or others) or an organic peroxide (e.g., dilauroyl peroxide (LPO), ditert-butyl peroxide (TBPO), diisopropyl peroxydicarbonate (IPP), and others). Once polymerization is completed, unreacted AN monomers are stripped off (e.g., by de-aeration under high vacuum) and the resulting PAN polymer solution is cooled down. At this stage, the PAN polymer is in a solution or dope form ready for spinning. Preferably, the PAN polymer is prepared by solution polymerization.

PAN polymer can also be made by suspension polymerization. To prepare the spinning solution by this method, the resulting PAN can be dissolved in solvents such as dimethyl sulfoxide (DMSO), dimethyl formamide (DMF), dimethyl acetamide (DMAc), ethylene carbonate (EC), zinc chloride ($ZnCl_2$)/water and sodium thiocyanate (NaSCN)/water to form the spinning solution.

According to a preferred embodiment, PAN polymerization is carried out based on the following formulation (% by weight (wt %)): >90% AN monomer; <5% co-monomer; <1% initiator, based on total weight of the components; and sufficient amount of solvent to form a solution containing 16 wt % to 28 wt % of final PAN polymer, preferably, 19 wt % to 24 wt %.

Spinning

To make PAN precursor fibers, the PAN polymer solution (i.e., spin "dope") is subjected to conventional wet spinning and/or air-gap spinning after removing air bubbles by vacuum. The spin dope can have a polymer concentration from about 16% to about 28% by weight, preferably from about 19 wt % to about 24 wt %, based on total weight of the solution. In wet spinning, the dope is filtered and extruded through holes of a spinneret (typically made of metal) into a liquid coagulation bath for the polymer to form filaments. The spinneret holes determine the desired filament count of the PAN fiber (e.g., 3,000 holes for 3K carbon fiber). In air-gap spinning, a vertical air gap of 1 to 50 mm, preferably 2 to 10 mm, is provided between the spinneret and the coagulating bath. In this spinning method, the polymer solution is filtered and extruded in the air from the spinneret and then extruded filaments are coagulated in a coagulating bath. Air-gap spinning is preferred.

The coagulation liquid used in the process is a mixture of solvent and non-solvent. Water or alcohol is typically used as the non-solvent. Suitable solvents include dimethyl sulfoxide, dimethyl formamide, dimethyl acetamide, sodium thiocyanate and zinc chloride. Dimethyl sulfoxide, dimethyl formamide and dimethyl acetamide are preferred, with dimethyl sulfoxide especially preferred. The ratio of solvent and non-solvent and bath temperature is used to adjust the solidification rate of the extruded nascent filaments in coagulation.

Coagulation conditions can have great effect on the structure and tensile properties of the precursor fibers and carbon fibers. According to the present invention, in order to obtain dense coagulated fibers with less voids, precursor fibers are coagulated in a coagulation bath concentration of about 70 wt % solvent or greater and up to about 30 wt % water. Preferably, the coagulation bath concentration of about 70 wt % to about 85 wt % solvent and about 15 wt % to about 30 wt % water. More preferably, the coagulation bath concentration of about 75 wt % to about 85 wt % solvent and about 15 wt % to about 25 wt % water. Temperature of the coagulation bath is from about 0° C. to about 10° C.

The spun filaments are then withdrawn from the coagulation bath by rollers through one or more wash baths to remove excess solvent and stretched in hot (e.g., 40° C. to 100° C.) water baths to impart molecular orientation to the filaments as the first step of controlling fiber diameter. The stretched filaments are then dried, for example, on drying rolls. The drying rolls can be composed of a plurality of rotatable rolls arranged in series and in serpentine configuration over which the filaments pass sequentially from roll to roll and under sufficient tension to provide filaments stretch or relaxation on the rolls. At least some of the rolls are heated by pressurized steam, which is circulated internally or through the rolls, or electrical heating elements inside of the rolls. Finishing oil can be applied onto the stretched fibers prior to drying in order to prevent the filaments from sticking to each other in downstream processes.

Processing conditions (including composition of the spin solution and coagulation bath, the amount of total baths, stretches, temperatures, and filament speeds) are correlated to provide filaments of a desired structure and denier.

Oxidation

To convert PAN precursor fibers into carbon fibers, the PAN precursor fibers are subjected to oxidation and carbonization. During the oxidation stage, the PAN fibers are fed under tension through one or more specialized ovens, into which heated air is fed. Oxidation can be carried out at an oven temperature of from about 200° C. to about 300° C. The oxidation process combines oxygen molecules from the air with the PAN fiber and causes the polymer chains to start crosslinking, thereby increasing fiber density to 1.3 g/cm$^3$ to 1.4 g/cm$^3$. In the oxidation process, tension applied to fiber is generally to control the fiber drawn or shrunk at a stretch ratio of 0.8 to 1.35, preferably 1.0 to 1.2. When the stretch ratio is 1, there is no stretch. And when the stretch ratio is greater than 1, the applied tension causes the fiber to be stretched. Such oxidized PAN fiber has an infusible ladder aromatic molecular structure and is ready for carbonization treatment.

Carbonization

Carbonization occurs in an inert (oxygen-free) atmosphere inside one or more specially designed furnaces. In a preferred embodiment, carbonization can be carried out in two steps. Here, the oxidized fiber is first passed through a pre-carbonization furnace that subjects the fiber to a heating temperature of from about 300° C. to about 800° C. while being exposed to an inert gas (e.g., nitrogen). This precarbonization is then followed by carbonization by passing the fiber through a furnace heated to a higher temperature of from about 700° C. to about 1500° C. while being exposed to an inert gas. Maximum carbonization temperature is from 1100° C. to 1500° C. Preferably, fiber tensioning is added throughout the precarbonization and carbonization processes. In pre-carbonization, the applied fiber tension is sufficient to control the stretch ratio to be within the range of 0.9 to 1.2. In carbonization, the tension used is sufficient to provide a stretch ratio of 0.9 to 1.05. Carbonization results in the crystallization of carbon molecules and consequently produces a finished carbon fiber that has more than 90 percent carbon content.

Adhesion between the matrix resin and carbon fiber is an important criterion in a carbon fiber-reinforced polymer composite. Because precursor fiber produced according to the present process is very dense, carbonization can be performed at a lower temperature. This is advantageous in that less graphitization occurs, resulting in a carbon fiber with more surface functionality for reacting with the matrix resin.

Surface Treatment

During the manufacture of carbon fiber, surface treatment may be performed after oxidation and carbonization to further enhance the adhesion between the resin matrix and the carbon fiber. Surface treatment can include pulling the carbonized fiber through an electrolytic bath containing an electrolyte, such as ammonium bicarbonate or sulfuric acid. The chemicals of the electrolytic bath add reactive chemical groups on the fiber surface that improve interfacial fiber/matrix bonding and also remove weakly bound crystallites for better mechanical bonding properties.

Next, the carbon fiber can be subjected to sizing, where a size coating (e.g., epoxy-based coating) is applied onto the fiber. Sizing can be carried out by passing the fiber through a size bath containing a liquid coating material. Sizing protects the carbon fiber during handling and processing into intermediate forms, such as dry fabric and prepreg. Sizing also holds filaments together in individual tows to reduce fuzz, improve processability and increase interfacial shear strength between the fiber and the matrix resin.

Following sizing, the coated carbon fiber is dried and then wound onto a bobbin.

Carbon fibers produced from the above-described PAN polymers have been found to have the following mechanical properties: tensile strength of greater than 700 Ksi (4826 MPa) and tensile initial modulus of greater than 38 Msi (262 GPa) per ASTM D 4018 test method.

The following Examples are provided for illustrating aspects of the invention and should not be construed as limiting the invention. Unless otherwise indicated, all modulus of elasticity measurements cited in the Examples were made according to ASTM D 4018. Fiber modulus values refer to tensile chord moduli of resin-impregnated tow strands determined between lower and upper strain limits of 0.1% and 0.6%, respectively. Moreover, tensile strengths were measured according to ASTM D 4018.

EXAMPLES

Example 1—Synthesis of Dope for Spinning

PAN polymers were prepared according to the formulations for PAN polymerization shown in Table 1. DMSO and AIBN were used for solution polymerization solvent and catalyst, respectively

TABLE 1

| | Formulations for PAN polymerization | | |
|---|---|---|---|
| Components | Formulation 1 (wt %) | Formulation 2 (wt %) | Formulation 3 (wt %) |
| Acrylonitrile (AN) | 99.30 | 99.00 | 98.00 |
| Itaconic acid (ITA) | 0.70 | 1.00 | |
| Methacrylic Acid (MAA) | | | 2.00 |

During solution polymerization, DMSO and AN were metered into a reactor. With nitrogen purge, the comonomer (ITA or MAA) and AIBN were added into the reactor at desired temperatures of 40°-85° C. The reaction took about 8-24 hours. After reaction, the reactant was then cooled down and discharged. After removing air bubbles by vacuum, the polymer solution (or spin "dope") was pumped to spin.

Example 2—Fabrication of PAN Precursor Fiber

PAN polymers produced from Formulations 1-3 as described in Table 1 above were used to form carbon fiber precursors (or white fibers) by the air-gap spinning method, with an air gap spacing of 2-10 mm Coagulation bath parameters were varied for each run as indicated in Table 2 below.

TABLE 2

Coagulation Bath Composition and Coagulated Fiber Density Results

| Run | PAN Formulation | White Fiber ID | Spinneret Capillary (μm) | Coag Bath Conc (% DMSO) | Coag Bath Temperature (deg C.) | Degree of Swelling (%) | Average Pore Diameter (μm) | Calculated Porosity (%) |
|---|---|---|---|---|---|---|---|---|
| 1 | 1 | A | 150 | 34.08 | 5.6 | 155 | 0.0672 | 82.20 |
| 2 | 1 | B | 150 | 79.75 | 8.6 | 153 | 0.0653 | 79.85 |
| 3 | 1 | C | 150 | 82.30 | 4.5 | 110 | 0.0125 | 56.01 |
| 4 | 3 | D | 150 | 83.95 | 8.5 | 99 | 0.0144 | 49.38 |
| 5 | 1 | E | 138 | 84.02 | 8.1 | 98 | 0.0145 | 48.08 |
| 6 | 2 | F | 138 | 84.02 | 8.3 | 92 | 0.1250 | 46.29 |

Properties of the white precursor fibers were determined as follows.

Porosimetry

Fiber samples exiting the coagulation bath were freeze-dried at −60° C. and the freeze-dried samples were tested by a mercury intrusion porosimeter for porosity and porous structure analysis. Mercury intrusion porosimetry characterizes a material's porosity by applying various levels of pressure to a sample immersed in mercury. It can measure pores sizes ranging from 500 μm to 35 nm. It is based on the physical principle that a non-reactive, non-wetting liquid will not penetrate pores until sufficient pressure is applied to force its entrance. In this instance, mercury is a non-wetting liquid for almost all substances, with a high contact angle against most solids. Mercury will not penetrate pores by capillary action, and requires force to enter into pore spaces. Considering Washburn's equation, entry into pore spaces requires applying pressure in inverse proportion to the pore opening size. When mercury is in contact with a pore opening having a circular cross-section, the surface tension of the mercury acts along the circle of contact for a length equal to the perimeter of the circle. This is assuming cylindrical pores. Based on this assumption, the force with which the mercury resists entering the pore is equal to $-\pi D\gamma \cos\theta$, where D is the pore diameter, γ the surface tension, and θ the contact angle. (The negative sign is introduced because for θ>90°, the term is intrinsically negative.) The force due to the externally applied pressure acts over the area of the circle (pore) of contact and is expressed as $\pi D^2 P/4$, where P is the applied pressure. At equilibrium, the following equation is true:

$$-\pi D\gamma\cos\theta = \frac{\pi D^2 P}{4}$$

The simplified version of this equation is known as the Washburn Equation:

$$D = \frac{-4\gamma\cos\theta}{P}$$

Based on this, the volume of mercury forced into the pores (and void spaces) increases directly with increased pressure. By increasing the applied pressure over a set range, a unique pressure-volume curve can be plotted. The pore size distribution is then easily obtained. The incremental and cumulative pore volume versus pore diameter can also be calculated.

For this measurement, a freeze-dried sample of known weight is placed into a penetrometer assembly of known weight and sealed. A "powder" sample bulb is used to prevent the fibers from being pulled into the stem. The sample is placed into the low pressure port of the porosimeter, where a vacuum is applied to remove air and residual moisture. The sample cell is then filled with mercury, and a pressure of 0.54 psia is obtained. The bulk density measurement is calculated at this point. The penetrometer then returns to atmospheric pressure, and it is removed and placed in the high pressure port to complete testing. In the high pressure port, the sample cell is surrounded by hydraulic fluid, and the pressure is incrementally increased up to 60,000 psia. At each pressure point, the volume of the intruded mercury is measured through changes in capacitance between the column of mercury in the dilatometer stem and the coaxial metal sheet surrounding the stem of the penetrometer assembly. Once the final pressure is reached, the skeletal density is calculated. Reports are then generated showing the pressure-volume curve and pore size distribution. Once the pore size distribution data is obtained, several data modifications were performed to calculate the most relevant and accurate data. The first modification was the exclusion of pores larger than 5 μm. Based on the log differential intrusion volume versus pore size plot, there is a distinctive region above 5 μm that accounts for inter-filament pores/spacings, and does not reflect internal pore structures. These measurements were removed to obtain only the intra-filament/internal pores. The second modification was to the percent porosity which was recalculated based on the intrusion volume below 5 μm, and a set skeletal density of 1.17 g/cc.

Degree of Swelling

For the degree of swelling, samples taken from the coagulation bath were first centrifuged at 3000 rpm for 15 minutes to remove the adhered liquid from the filament surface. The collected samples were then submerged in a glass beaker/flask containing deionized water (DIW), and "washed" for a minimum of 15 minutes. This washing step was then repeated twice more with fresh DIW to ensure the samples were fully coagulated and solvent been removed. Once the final wash was completed, the sample was centrifuged again at 3,000 rpm for 15 minutes and weighed to obtain the $W_a$ (after-wash) weight. Samples were then placed in an air circulating oven at 110° C. for 3 hours. Following drying, samples were removed from the oven and placed in a desiccator for a minimum of ten minutes. The dried and desiccated samples were re-weighed and the final weight recorded as $W_f$. The degree of swelling was then calculated using the following formulas:

Degree of Swelling (%)=$(W_a-W_f)\times(100/W_f)$

PAN fibers based on Runs 4-6 from Table 2 were found to have good structures with low porosity and no macrovoids as measured by the degree of swelling test and mercury intrusion porosimetry. As a result, the subsequent carbon fiber from these low porosity precursors yielded tensile strengths ranging from 778 to 829 ksi.

Converting White Fibers into Carbon Fibers

Carbon fiber precursors produced from Runs 1-6 were oxidized using multistage ovens. Total stretch was <10%. Oven temperatures were in the range of 200° C.-300° C. Total residence time was <150 minutes. The oxidized fibers were carbonized in multistage furnaces. The lower temperature furnace (referred to as the pre-carbonization furnace) operated in the temperature range of 300° C.-800° C. Total stretch was <10%. The high temperature furnace (referred to as the carbonization furnace) operated in the temperature range of 700° C.-1500° C. Maximum carbonization temperature was from 1100° C. to 1500° C. Total relax was <5%. The carbonized fibers were then surface-treated and sized with epoxy compatible sizing.

Tensile strength and tensile modulus of the resulting carbon fibers were determined and are shown in Table 3.

TABLE 3

| Carbon Fiber Properties | | | | | | |
|---|---|---|---|---|---|---|
| Run | 1 | 2 | 3 | 4 | 5 | 6 |
| White Fiber ID | A | B | C | D | E | F |
| Carbon Fiber tensile strength (ksi) | 571 | 689 | 778 | 784 | 829 | 800 |
| Carbon Fiber tensile modulus (Msi) | 40.6 | 41.4 | 41.1 | 44.1 | 42.7 | 42.6 |
| Carbon Fiber density (g/cm$^3$) | 1.795 | 1.788 | 1.803 | 1.824 | 1.812 | 1.817 |

Carbon fiber tensile strength and initial tensile modulus was determined per ASTM D4018 and SRM 16. Density testing was based on ASTM D3800 and SRM 15.

While the invention has been described with reference to a preferred embodiment, it will be understood by those skilled in the art that various changes may be made and equivalents may be substituted for elements thereof without departing from the scope of the invention. Further, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for producing carbon fibers comprising:
    forming a polyacrylonitrile (PAN) polymer solution having a concentration of about 19% to about 24% by weight of PAN polymer;
    spinning the PAN polymer solution by air-gap spinning, whereby the PAN polymer solution is extruded in air from a spinneret to form filaments and then the extruded filaments are coagulated in a coagulation bath containing about 70% to about 85% by weight of dimethyl sulfoxide and about 15% to about 30% by weight of water, thereby forming carbon precursor fibers;
    drawing the carbon precursor fibers through one or more draw and wash baths, wherein the carbon precursor fibers are substantially free of solvent after the step of drawing the carbon precursor fibers; and
    stabilizing and carbonizing the carbon precursor fibers to form carbon fibers;
    wherein
    the PAN polymer is a copolymer formed from polymerization of an acrylonitrile monomer with itaconic acid and/or methacrylic acid as the only co-monomer(s) in the presence of an initiator and at a temperature of 40° C. to 85° C.;
    the temperature of the coagulation bath is in the range of 0° C. to 10° C.,
    the carbon precursor fibers exiting from the coagulation bath have a degree of swelling of from about 80% to about 120%, an average pore diameter of about 0.01 µm to about 0.03 µm and a porosity of about 30% to about 70%, and
    the carbon precursor fibers are carbonized at a temperature of from about 1100° C. to about 1500° C.

2. The process of claim 1, wherein the PAN polymer has a weight averaged molecular weight ($M_w$) of about 120,000 to about 180,000.

3. The process of claim 1, wherein the air-gap spacing from a face of the spinneret to a surface of the coagulation bath is about 2.0 to about 10.0 mm.

4. The process of claim 1, wherein the bath temperature of the one or more draw and wash baths is from about 40° C. to about 100° C.

5. The process of claim 1 further comprising stretching the carbon precursor fibers in the drawing step.

6. The process of claim 1, wherein the carbon precursor fibers are drawn at a speed of about 100 to about 400 meters per minute during the step of drawing.

7. The process of claim 1 further comprising stabilizing the carbon precursor fibers in air at an oxidation temperature of about 200° C. to about 300° C. at a stretch ratio of about 0.80 to about 1.35.

8. The process of claim 1, wherein the PAN polymer has a copolymer content of up to about 4% and an acrylonitrile content of about 96% or greater.

9. The process of claim 1, wherein the carbon fibers produced after carbonizing have a tensile strength of about 800 ksi or greater and a modulus of elasticity of about 40 Msi or greater.

10. The process of claim 1, wherein
    the coagulation bath contains from 82.3% to 84.02% by weight of dimethyl sulfoxide and the coagulation bath temperature is 4.5° C. to 8.5° C., and
    the carbon precursor fibers exiting from the coagulation bath have a degree of swelling of from 98% to 110%, and an average pore diameter of 0.0125 µm to 0.0145 µm with a porosity of 48.08% to 56.01%.

11. The process of claim 1, wherein the initiator is an azo-containing compound or an organic peroxide.

* * * * *